UNITED STATES PATENT OFFICE.

FRITZ HABER, OF KARLSRUHE, AND ROBERT LE ROSSIGNOL, OF BERLIN, GERMANY, ASSIGNORS TO BADISCHE ANILIN AND SODA FABRIK, OF LUDWIGSHAFEN-ON-THE-RHINE, GERMANY, A CORPORATION OF GERMANY.

PRODUCTION OF AMMONIA.

1,006,206.      Specification of Letters Patent.      Patented Oct. 17, 1911.

No Drawing.      Application filed July 1, 1910. Serial No. 569,961.

*To all whom it may concern:*

Be it known that we, FRITZ HABER, Ph. D., professor of chemistry, and ROBERT LE ROSSIGNOL, B. Sc., subjects, respectively, of the King of Prussia and the King of England, residing, respectively, at Karlsruhe and Berlin, Germany, have invented new and useful Improvements in the Production of Ammonia, of which the following is a specification.

For a long time the synthetical production from its elements of ammonia, which is of great importance both for industry and agriculture, has been considered one of the most important problems of chemical technology, but all efforts in this direction have up to the present remained fruitless. It is true that it is known that nitrogen and hydrogen combine to form ammonia with the use of suitable catalytic agents, but even when employing the best known catalytic agents, the yields of ammonia obtained are so small that even an analytical determination thereof presents difficulties. The reaction was consequently only of theoretical importance and a technical use thereof was not to be thought of. During his studies on the equilibrium of ammonia, Nernst carried out the reaction under pressures of from 50 to 70 atmospheres in order to obtain measurable quantities of ammonia. When working in this manner and employing a very slow current of gas, the best concentration he obtained was scarcely 0.9 per cent. As soon, however, as he increased the temperature to obtain a greater velocity of reaction and to enable the gases to be passed more quickly, the concentration fell considerably (*cf.* Jost, *Über die Verwendung Eines Elektrischen Druckofens bei Behandlung Chemischer Gleichgewichte, Dissertation*, Berlin, 1908, pp. 23–4). These results led Nernst to pass a very unfavorable opinion on the possibility of producing ammonia on a technical scale from its elements (*cf. inter alia, Zeitschrift für Elektrochemie*, 1907, p. 524).

It has now been found that ammonia can be prepared on a technical scale directly from its elements when employing catalytic agents, if the reaction be carried out under very high pressures, for instance at about 100 atmospheres, or preferably at from 150 to 250 atmospheres, or even higher.

By the present process, even if relatively less favorable catalytic agents, such as iron, be employed, ammonia can be prepared in such concentration, for instance over 2 per cent., as to permit of carrying out the reaction on a technical scale, while more active catalytic agents produce considerably more favorable results, and it is easily possible to increase the concentration of the ammonia to such a degree that it can be separated out in the liquid form merely by the application of cold.

The process of our invention can be carried out in a suitable vessel which is capable of withstanding the very high pressure used, or an ordinary vessel can be employed, provided that it is surrounded by a cover capable of resisting the pressure. The catalytic agent is passed into the vessel and a mixture of or containing hydrogen and nitrogen is passed through with the aid of a pump, and either the vessel or the gases which are being introduced or the catalytic agent or more than one of these single elements can be heated so as to produce or maintain the necessary temperature. The temperature at which the reaction can be carried out may vary considerably, for instance an incipient red heat may be used, although of course a temperature at which decomposition of the ammonia takes place should not be employed.

The following example will serve to illustrate the nature of this invention, but we do not limit the invention in any way to the example given. Pass a mixture of one part of nitrogen with three parts of hydrogen at a temperature of from six hundred and fifty to seven hundred degrees centigrade, and at a pressure of two hundred atmospheres, with an hourly velocity of two hundred and fifty liters (measured at ordinary pressure), over iron which has been produced by the reduction of the purest commercial iron oxid and which occupies a space of twenty cubic centimeters. In this way a yield of two hundred and fifty grams of ammonia per hour per liter contact material can easily be obtained.

Now what we claim is:—

1. The process of producing ammonia by passing a mixture containing nitrogen and hydrogen over a suitable catalytic agent at a pressure of exceeding 100 atmospheres.

2. The process of producing ammonia by passing a mixture containing nitrogen and hydrogen over a suitable catalytic agent at a pressure of between 150 and 250 atmospheres.

3. The process of producing ammonia by passing a mixture containing nitrogen and hydrogen over a suitable catalytic agent at a pressure of exceeding 100 atmospheres and causing the ammonia which is obtained to be separated directly in the liquid form.

4. The process of producing ammonia by passing a mixture containing nitrogen and hydrogen over a suitable catalytic agent at a pressure of between 150 and 250 atmospheres and causing the ammonia which is obtained to be separated directly in the liquid form.

5. The process for the production of ammonia by passing a mixture containing nitrogen and hydrogen over iron at a pressure of from 150 to 250 atmospheres and causing the ammonia which is obtained to be separated directly in the liquid form.

6. The process for the production of ammonia by passing a mixture containing three volumes of nitrogen and one volume of hydrogen over iron at a pressure of from one hundred and fifty to two hundred and fifty atmospheres and causing the ammonia which is obtained to be separated directly in the liquid form.

In testimony whereof we have hereunto set our hands in the presence of the subscribing witnesses.

FRITZ HABER.
ROBERT LE ROSSIGNOL.

Witnesses to the signature of F. Haber:
J. ALEC. LLOYD,
ERNEST FRANCIS EHRHARDT.

Witnesses to the signature of R. Le Rossignol:
HENRY HASPER,
WOLDEMAR HAUPT.